(12) United States Patent
Takahama et al.

(10) Patent No.: US 10,844,469 B2
(45) Date of Patent: Nov. 24, 2020

(54) METHOD FOR MANUFACTURING MEMBER

(71) Applicant: SUMITOMO ELECTRIC HARDMETAL CORP., Itami (JP)

(72) Inventors: Kazushi Takahama, Itami (JP); Satoru Kukino, Itami (JP)

(73) Assignee: Sumitomo Electric Hardmetal Corp., Itami (JP)

( * ) Notice: Subject to any disclaimer, the term of this patent is extended or adjusted under 35 U.S.C. 154(b) by 4 days.

(21) Appl. No.: 16/086,131

(22) PCT Filed: Dec. 19, 2017

(86) PCT No.: PCT/JP2017/045552
§ 371 (c)(1),
(2) Date: Sep. 18, 2018

(87) PCT Pub. No.: WO2018/211732
PCT Pub. Date: Nov. 22, 2018

(65) Prior Publication Data
US 2019/0276922 A1     Sep. 12, 2019

(30) Foreign Application Priority Data
May 18, 2017   (JP) .................................. 2017-099261

(51) Int. Cl.
*C23C 4/18* (2006.01)
*B23B 27/14* (2006.01)
(Continued)

(52) U.S. Cl.
CPC ............... *C23C 4/18* (2013.01); *B23B 27/14* (2013.01); *B23B 27/148* (2013.01); *B23B 27/20* (2013.01);
(Continued)

(58) Field of Classification Search
None
See application file for complete search history.

(56) References Cited

U.S. PATENT DOCUMENTS

2008/0286558 A1* 11/2008 Kukino ................. B23B 27/141
428/323

FOREIGN PATENT DOCUMENTS

EP          0791420 A1    8/1997
JP       2006-000952 A    1/2006
(Continued)

OTHER PUBLICATIONS

Machine Translation of JP 2012-107277 A (Year: 2012).*

*Primary Examiner* — Shamim Ahmed
*Assistant Examiner* — Bradford M Gates
(74) *Attorney, Agent, or Firm* — Baker Botts L.L.P.; Michael A. Sartori

(57) ABSTRACT

A method for manufacturing a member according to one embodiment of the present disclosure is a method for manufacturing a member having a substrate and a sprayed coating formed on a surface of the substrate. The method includes: supplying an oil into a recessed portion of the sprayed coating, a kinematic viscosity of the oil at 40° C. being more than or equal to 3 mm²/s and less than or equal to 43 mm²/s; and dry-cutting, using a cutting tool, a surface of the sprayed coating with the recessed portion supplied with the oil. A supplied amount of the oil is more than or equal to 0.1 weight % and less than or equal to 2.7 weight % with respect to an apparent weight of the sprayed coating.

7 Claims, 3 Drawing Sheets

(51) Int. Cl.
*F02F 1/00* (2006.01)
*B23P 13/02* (2006.01)
*B23Q 11/10* (2006.01)
*C10M 171/02* (2006.01)
*B23B 27/20* (2006.01)

(52) U.S. Cl.
CPC .............. *B23P 13/02* (2013.01); *B23Q 11/10* (2013.01); *C10M 171/02* (2013.01); *F02F 1/00* (2013.01); *B23B 2228/10* (2013.01)

(56) References Cited

FOREIGN PATENT DOCUMENTS

| | | | |
|---|---|---|---|
| JP | 2008-221445 A | | 9/2008 |
| JP | 2012107277 A | * | 6/2012 |

* cited by examiner

METHOD FOR MANUFACTURING MEMBER

TECHNICAL FIELD

The present disclosure relates to a method for manufacturing a member. More particularly, the present disclosure relates to a method for manufacturing a member having a substrate and a sprayed coating formed on a surface of the substrate. The present application claims a priority based on Japanese Patent Application No. 2017-099261 filed on May 18, 2017, the entire content of which is incorporated herein by reference.

BACKGROUND ART

Conventionally, as a method for manufacturing a member having a sprayed coating, a method described in Japanese Patent Laying-Open No. 2008-221445 (Patent Document 1) has been known. In the method described in Patent Document 1, a sprayed coating that coats a surface of a substrate is cut using a cutting tool having a cutting edge constituted of cubic boron nitride.

Moreover, conventionally, as a method for machining a sintered magnetic material, a method described in Japanese Patent Laying-Open No. 2006-952 (Patent Document 2) has been known. In the method of Patent Document 2, a sintered material to be cut is immersed in an oil at a pressure reduced from the atmospheric pressure, before cutting the sintered material.

CITATION LIST

Patent Document

PTD 1: Japanese Patent Laying-Open No. 2008-221445
PTD 2: Japanese Patent Laying-Open No. 2006-952

SUMMARY OF INVENTION

A method for manufacturing a member according to one embodiment of the present disclosure is a method for manufacturing a member having a substrate and a sprayed coating formed on a surface of the substrate. The method for manufacturing the member according to one embodiment of the present disclosure includes: supplying an oil into a recessed portion of the sprayed coating, a kinematic viscosity of the oil at 40° C. being more than or equal to 3 $mm^2/s$ and less than or equal to 43 $mm^2/s$; and dry-cutting, using a cutting tool, a surface of the sprayed coating with the recessed portion supplied with the oil. At least a portion of the cutting tool is constituted of a sintered material of cubic boron nitride, and a cutting edge of the cutting tool is formed at the sintered material of cubic boron nitride. A supplied amount of the oil is more than or equal to 0.1 weight % and less than or equal to 2.7 weight % with respect to an apparent weight of the sprayed coating.

DETAILED DESCRIPTION

Figure 1:
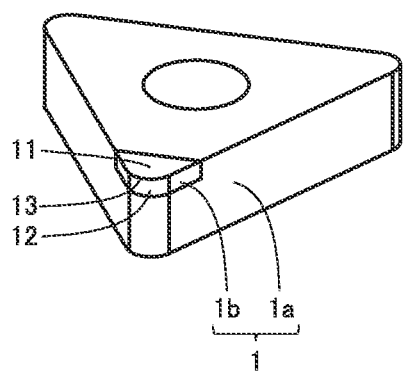
FIG. 1 is a perspective view of a cutting tool 1.

Problem to be Solved by the Present Disclosure

A sprayed coating has a large surface roughness, and voids are formed therein. A cutting condition when a cutting edge passes through the voids is similar to a disengaged condition in interrupted cutting. In the interrupted cutting, the cutting tool is severely damaged by wear. In the interrupted cutting, a water-soluble coolant is generally used to reduce wear of the cutting tool.

When cutting a sprayed coating using a cutting tool having a cutting edge constituted of cemented carbide or cermet, wear of the cutting tool is reduced by supplying a water-soluble coolant to the cutting edge. However, when the sprayed coating is cut using the cutting tool having the cutting edge constituted of cubic boron nitride, the supply of the water-soluble coolant to the cutting edge may cause a multiplicity of minute micro-chippings in the cutting edge, with the result that wear may be conversely promoted. This is presumably due to the following reason: the water-soluble coolant, which has a high coolability, efficiently cools the cutting edge that is cutting the sprayed coating including the voids, thereby causing a strong thermal shock on the cutting edge. Hence, conventionally, it has been considered that completely dry machining is desirable when cutting a sprayed coating using a cutting tool having a cutting edge constituted of cubic boron nitride.

It should be noted that in the method described in Patent Document 2, the above problem is not described or suggested. Moreover, in the method described in Patent Document 2, in order to infiltrate the oil into the voids in the sintered material, it is necessary to not only immerse the sintered material in the oil but also reduce the pressure.

The present disclosure has been made in view of the above-described problem of the conventional art. More specifically, the present disclosure provides a method for manufacturing a member by which the tool life of a cutting tool can be improved.

Advantageous Effect of the Present Disclosure

According to the method for manufacturing the member according to one embodiment of the present disclosure, the tool life of the cutting tool can be improved.

DESCRIPTION OF EMBODIMENT

First, embodiments of the present disclosure will be listed and described.

(1) A method for manufacturing a member according to one embodiment of the present disclosure is a method for manufacturing a member having a substrate and a sprayed coating formed on a surface of the substrate. The method for manufacturing the member according to one embodiment of the present disclosure includes: supplying an oil into a recessed portion of the sprayed coating, a kinematic viscosity of the oil at 40° C. being more than or equal to 3 $mm^2/s$ and less than or equal to 43 $mm^2/s$; and dry-cutting, using a cutting tool, a surface of the sprayed coating with the recessed portion supplied with the oil. At least a portion of the cutting tool is constituted of a sintered material of cubic boron nitride, and a cutting edge of the cutting tool is formed at the sintered material of cubic boron nitride. A supplied amount of the oil is more than or equal to 0.1 weight % and less than or equal to 2.7 weight % with respect to an apparent weight of the sprayed coating.

According to the method for manufacturing the member according to (1), the tool life of the cutting tool can be improved.

(2) In the method for manufacturing the member according to (1), the supplying of the oil may be performed by applying the oil to the surface of the sprayed coating. According to the method for manufacturing the member according to (2), the tool life of the cutting tool can be improved.

(3) In the method for manufacturing the member according to (1), the supplying of the oil may be performed by immersing the sprayed coating into the oil. According to the method for manufacturing the member according to (3), the tool life of the cutting tool can be further improved.

(4) In the method for manufacturing the member according to (1) to (3), the cutting tool may further include a coating layer that coats the sintered material of cubic boron nitride. The coating layer may be constituted of a compound including at least one or more elements selected from a group consisting of titanium, aluminum, and chromium, and at least one or more elements selected from a group consisting of nitrogen, carbon, and oxygen.

According to the method for manufacturing the member according to (4), the cutting edge provided with the coating is suppressed from being worn, whereby the life of the cutting tool can be improved.

(5) In the method for manufacturing the member according to (1) to (4), in the dry-cutting using the cutting tool, the dry-cutting may be performed while supplying an inactive substance to the cutting edge.

According to the method for manufacturing the member according to (5), the cutting edge is suppressed from being worn due to oxidation during the cutting, whereby the life of the cutting tool can be further improved.

(6) In the method for manufacturing the member according to (5), the inactive substance may be a gas or solid of carbon dioxide.

According to the method for manufacturing the member according to (6), fire safety for the oil can be improved and the manufacturing cost can be reduced.

Details of Embodiment of the Present Disclosure

Next, the following describes details of an embodiment of the present disclosure with reference to figures. It should be noted that the same or corresponding portions in the figures are given the same reference characters. Moreover, at least a part of the embodiments described below may be appropriately combined.

(Cutting Tool Used in Method for Manufacturing Member According to Embodiment)

The following describes a configuration of a cutting tool 1 used for a method for manufacturing a member according to an embodiment.

FIG. 1 is a perspective view of cutting tool 1. As shown in FIG. 1, cutting tool 1 is a cutting insert, for example. However, cutting tool 1 is not limited to this. Cutting tool 1 has a rake face 11, a flank face 12, and a cutting edge 13. Flank face 12 is continuous to rake face 11. Cutting edge 13 is constituted of a ridgeline between rake face 11 and flank face 12.

Figure 2:
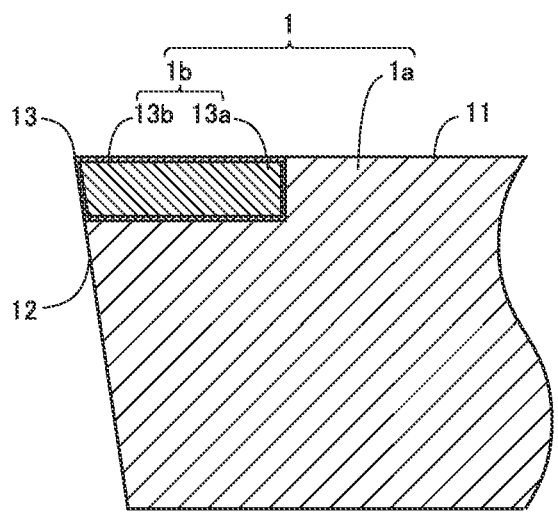
FIG. 2 is a cross sectional view perpendicular to a cutting edge 13 of cutting tool 1.

Cutting tool 1 may include: a substrate 1a; and a cutting edge tip 1b attached to substrate 1a. Cutting edge 13 may be provided at cutting edge tip 1b. FIG. 2 is a cross sectional view perpendicular to cutting edge 13 of cutting tool 1. Cutting edge tip 1b includes a base 13a. Cutting edge tip 1b may include a coating layer 13b. Base 13a is constituted of a sintered material of cubic boron nitride (CBN). Coating layer 13b coats a surface of base 13a.

Coating layer 13b is constituted of a compound including: one or more elements selected from a group consisting of titanium (Ti), aluminum (Al), and chromium (Cr); and one or more elements selected from a group consisting of nitrogen (N), oxygen (O), and carbon (C). Coating layer 13b is constituted of TiCN, TiAlN, or AlCrN, for example.

Cutting tool 1 may not have cutting edge tip 1b. That is, cutting edge 13 may be provided at substrate 1a. In this case, substrate 1a may be formed of a bulk body of the sintered material of CBN. In this case, coating layer 13b may be provided on a surface of substrate 1a.

(Workpiece Used in Method for Manufacturing Member According to Embodiment)

The following describes a workpiece 2 used in the method for manufacturing the member according to the embodiment.

Figure 3:
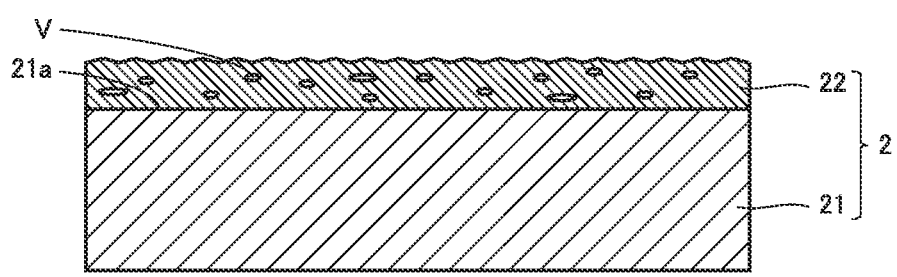
FIG. 3 is a cross sectional view of a workpiece 2.

FIG. 3 is a cross sectional view of workpiece 2. As shown in FIG. 3, workpiece 2 has a substrate 21 and a sprayed coating 22.

Substrate 21 is a cylinder block, for example. However, substrate 21 is not limited to this. Substrate 21 has a surface 21a. Surface 21a corresponds to a bore surface of the cylinder block, for example. For substrate 21, an aluminum (Al) alloy is used, for example. However, the material used for substrate 21 is not limited to this.

Sprayed coating 22 is a coating film formed by thermal spraying. Sprayed coating 22 is formed on surface 21a of substrate 21. Depressions exist at the surface of sprayed coating 22. Voids V exist in sprayed coating 22. There are voids V communicating with the surface of sprayed coating 22, and there are voids V not communicating with the surface of sprayed coating 22. It should be noted that in the description below, the expression "recessed portion of sprayed coating 22" collectively represents the depressions at the surface of sprayed coating 22 and voids V existing in sprayed coating 22 and communicating with the surface of sprayed coating 22. For sprayed coating 22, a material having a more excellent wear resistance than that of substrate 21 is used. When substrate 21 is an Al alloy, a low-carbon steel is used for sprayed coating 22, for example. The low-carbon steel is a steel having a carbon content of less than or equal to 0.3%.

(Method for Manufacturing Member According to Embodiment)

The following describes each of steps of the method for manufacturing the member according to the embodiment.

Figure 4:
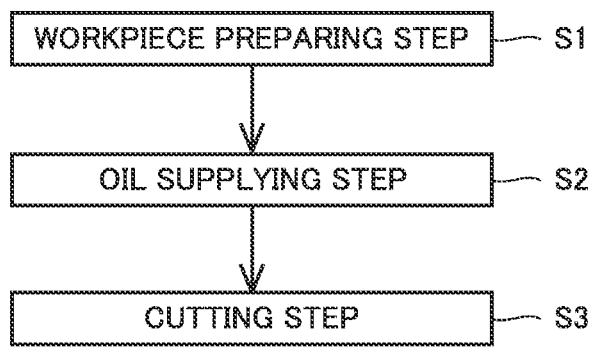
FIG. 4 is a flowchart showing a method for manufacturing a member according to an embodiment.

FIG. 4 is a flowchart showing the method for manufacturing the member according to the embodiment. As shown in FIG. 4, the method for manufacturing the member according to the embodiment includes a workpiece preparing step S1, an oil supplying step S2, and a cutting step S3.

In workpiece preparing step S1, workpiece 2 is prepared. Workpiece 2 is prepared by thermally spraying, to surface 21a of substrate 21, a material for sprayed coating 22. This thermal spraying is performed by plasma spraying, for example. However, the thermal spraying method is not limited to this.

Figure 5A:
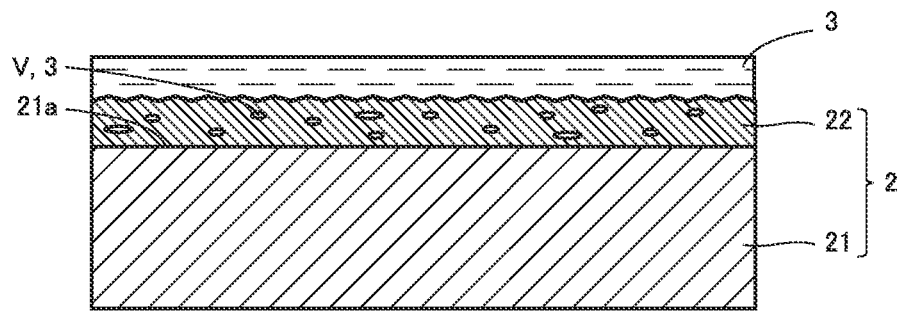
FIG. 5A is an exemplary cross sectional view of workpiece 2 in an oil supplying step S2.

In oil supplying step S2, oil 3 is supplied to the recessed portion of sprayed coating 22. More specifically, in oil supplying step S2, oil 3 is supplied to the depressions at the surface of sprayed coating 22 as well as voids V existing in sprayed coating 22 and communicating with the surface of sprayed coating 22. FIG. 5A is an exemplary cross sectional view of workpiece 2 in oil supplying step S2. As shown in FIG. 5A, oil 3 may be supplied to voids V in sprayed coating 22 by applying oil 3 to the surface of sprayed coating 22 and infiltrating applied oil 3 into the inside of sprayed coating 22 (filling voids V communicating with the surface of sprayed coating 22).

A value obtained by dividing the supplied amount of oil 3 to the recessed portion of sprayed coating 22 by the apparent weight of sprayed coating 22 (a ratio of the supplied amount of oil 3 to the recessed portion of sprayed coating 22 to the apparent weight of sprayed coating 22) is preferably more than or equal to 0.1 weight % and less than or equal to 2.7 weight %. It is assumed that the apparent weight of sprayed coating 22 refers to the weight of sprayed coating 22 including the weight of oil 3 supplied to the recessed portion. The supplied amount of oil 3 to the recessed portion of sprayed coating 22 is measured in the following manner, for example. First, a small piece (the size of the small piece is 1 cm×1 cm×0.03 cm, for example) is dry-cut from substrate 21 including sprayed coating 22 using a band saw, a slicer, or the like. It should be noted that a portion of the small piece may include substrate 21; however, a ratio of sprayed coating 22 included in the small piece is more than or equal to 80 volume %. The small piece includes the surface of sprayed coating 22 to be cut. The shape of the small piece is a rectangular parallelepiped shape. However, the surface of sprayed coating 22 to be cut may include a curved surface. Next, the small piece is held in the atmospheric air in a heat treating furnace at 500° C. Then, the supplied amount of oil 3 supplied to the recessed portion of sprayed coating 22 is measured by measuring a difference between the weight of the small piece before introducing the small piece into the heat treating furnace and the weight of the small piece after introducing the small piece into the heat treating furnace.

Figure 5B:
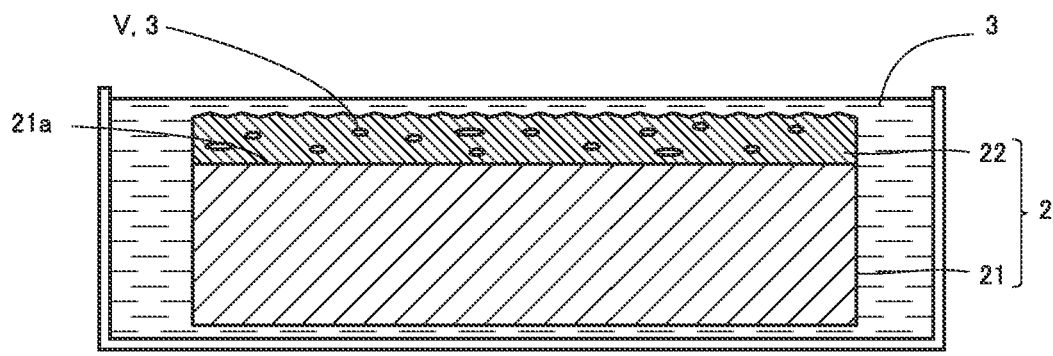
FIG. 5B is another exemplary cross sectional view of workpiece 2 in oil supplying step S2.

FIG. 5B is another exemplary cross sectional view of workpiece 2 in oil supplying step S2. As shown in FIG. 5B, oil supplying step S2 is performed by immersing workpiece 2 into oil 3 (by immersing sprayed coating 22 into oil 3).

It should be noted that in order to promote the supply of oil 3 to the recessed portion of sprayed coating 22, oil supplying step S2 is desirably performed under a reduced pressure environment; however, in order to simplify the operation, oil supplying step S2 is desirably performed without reducing the pressure (under the atmospheric pressure). Hence, for oil 3, it is desirable to use an oil that can be infiltrated into sprayed coating 22 without reducing the pressure.

Oil 3 is in the form of a liquid functioning as a lubricant. Examples of oil 3 include a machining oil, a hydraulic oil, and a rust preventive oil.

In order to promote infiltration of oil 3 into sprayed coating 22, a kinematic viscosity of oil 3 at 40° C. is more than or equal to 3 mm$^2$/s. In this case, oil 3 is infiltrated into sprayed coating 22 without reducing the pressure. In order to suppress oil 3 from leaking from the inside of sprayed coating 22, the kinematic viscosity of oil 3 at 40° C. is less than or equal to 43 mm$^2$/s. The kinematic viscosity of oil 3 at 40° C. is preferably more than or equal to 3 mm$^2$/s and less than or equal to 25 mm$^2$/s. It should be noted that the kinematic viscosity of oil 3 is measured using a vibration type viscometer, VISCOMATE VM-100A-L (provided by Sekonic).

Figure 6:
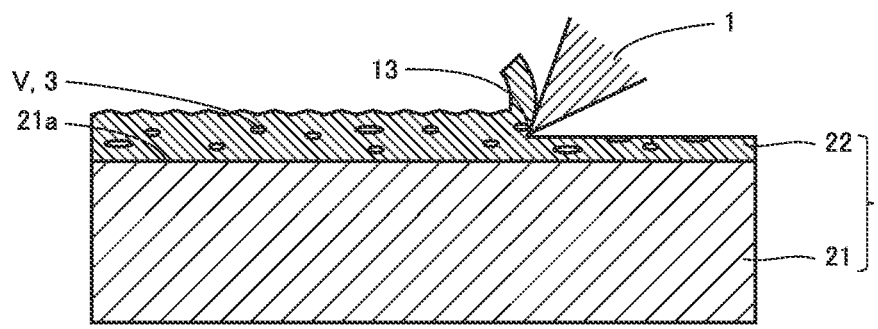
FIG. 6 is a cross sectional view of workpiece 2 in a cutting step S3.

FIG. 6 is a cross sectional view of workpiece 2 in cutting step S3. As shown in FIG. 6, in cutting step S3, the surface of sprayed coating 22 is cut using cutting tool 1. This cutting is dry-cutting. The dry-cutting means cutting performed without externally supplying a liquid coolant to a contact portion between cutting edge 13 of cutting tool 1 and the workpiece. In this cutting, an amount of depth of cut by cutting tool 1 is preferably more than or equal to 0.02 mm and less than or equal to 1.00 mm, and is more preferably more than or equal to 0.05 mm and less than or equal to 0.30 mm, for example. In this cutting, the feed rate of cutting tool 1 is preferably more than or equal to 0.03 mm/rev and less than or equal to 0.30 mm/rev, for example. In this cutting, the cutting speed of cutting tool 1 is preferably more than or equal to 50 m/min and less than or equal to 800 m/min, for example. It should be noted that in cutting step S3, sprayed coating 22 is preferably cut while supplying an inactive substance to cutting edge 13. Examples of the inactive substance include: a gas of carbon dioxide ($CO_2$), argon (Ar), nitrogen ($N_2$), or the like; or dry ice powder. The inactive substance may be a mixture of these. In the manner described above, the method for manufacturing the member according to the embodiment is completed.

(Effect of Method for Manufacturing Member According to Embodiment)

The following describes an effect of the method for manufacturing the member according to the embodiment.

As described above, voids V exist in sprayed coating 22. Further, sprayed coating 22 has a large surface roughness (depressions exist at the surface). Therefore, sprayed coating 22 is cut in a manner similar to interrupted cutting. This results in a large temperature fluctuation of cutting tool 1 due to cutting heat caused by contact between cutting edge 13 and sprayed coating 22 (occurrence of the following situations: the temperature of one of adjacent portions of cutting edge 13 is greatly increased but the temperature of the other of the adjacent portions is not increased much; the temperature of a portion of cutting edge 13 is greatly increased at a certain time but is not increased much at another time; and the like).

If sprayed coating 22 is wet-cut (that is, if a water-soluble coolant is externally supplied to cutting edge 13 during cutting), cutting tool 1 is abruptly cooled by the water-soluble coolant. Hence, if sprayed coating 22 is wet-cut, a large thermal shock is applied to cutting tool 1 due to the abrupt cooling by the water-soluble coolant and the large temperature fluctuation by the cutting heat. As a result of this thermal shock, cutting tool 1 is severely damaged.

As described above, in the method for manufacturing the member according to the embodiment, cutting step S3 is performed by way of the dry-cutting. Hence, in the method for manufacturing the member according to the embodiment, the thermal shock applied to the cutting tool is reduced as compared with the case of the wet-cutting.

Generally, in the dry-cutting, the lubrication of cutting edge 13 may be insufficient as compared with that of the wet-cutting. As described above, in the method for manufacturing the member according to the embodiment, oil 3 is supplied to voids V communicating with the surface of sprayed coating 22. As the cutting progresses, voids V are exposed to outside at the cutting point. On this occasion, oil 3, which fills voids V, leaks out to a contact portion between cutting edge 13 and the workpiece, whereby cutting edge 13 is lubricated. Hence, in the method for manufacturing the member according to the embodiment, the dry-cutting is performed while the lubrication of cutting edge 13 can be secured.

The thermal conductivity of oil 3 is smaller than the thermal conductivity of water included in a water-soluble coolant, and is close to the thermal conductivity of sprayed coating 22 (a representative thermal conductivity of oil 3 is about 140 W/(K·m), the thermal conductivity of water is about 640 W/(K·m), and the thermal conductivity of iron (Fe) is about 80 W/(K·m)).

Therefore, cutting tool 1 is not abruptly cooled by oil 3 leaking from voids V communicating with the surface of sprayed coating 22 to the contact portion between cutting edge 13 and the workpiece. That is, oil 3 leaking from voids V inside sprayed coating 22 to the vicinity of cutting edge 13 does not greatly increase the thermal shock to cutting tool 1.

Thus, in the method for manufacturing the member according to the embodiment, the lubrication of cutting edge 13 can be secured without greatly increasing the thermal shock to cutting tool 1, whereby the tool life of cutting tool 1 can be improved.

When oil supplying step S2 is performed by immersing sprayed coating 22 into oil 3 in the method for manufacturing the member according to the embodiment, a large amount of oil 3 can be supplied to the recessed portion of sprayed coating 22. Accordingly, in this case, the lubrication effect of cutting edge 13 is increased further, whereby the tool life of cutting tool 1 can be improved.

Generally, a material with a high hardness has a low shock resistance. In the method for manufacturing the member according to the embodiment, the thermal shock to cutting tool 1 is reduced as described above. Hence, even when cutting edge 13 is provided at base 13a constituted of the sintered material of CBN, breakage or the like of cutting tool 1 is less likely to be caused due to the thermal shock during the cutting. Therefore, in the method for manufacturing the member according to the embodiment, when cutting edge 13 is provided at base 13a constituted of the sintered material of CBN, the hardness of cutting edge 13 is increased, whereby the tool life of cutting tool 1 can be further improved.

As described above, in the method for manufacturing the member according to the embodiment, since the dry-cutting is performed, the temperature of cutting tool 1 is likely to be increased due to the cutting. As the temperature is increased, cutting tool 1 is more likely to be worn due to oxidation of the material of cutting edge 13. In the method for manufacturing the member according to the embodiment, when the cutting is performed while supplying the inactive substance to cutting edge 13, the oxidation of the material of cutting edge 13 is suppressed. Moreover, since the oxidation of the material of cutting edge 13 is suppressed, oil 3 included in sprayed coating 22 can be prevented from being ignited. Among inactive substances, carbon dioxide, which is used also for a carbon dioxide fire extinguisher, is excellent in term of fire safety for oil 3. Moreover, carbon dioxide is excellent also in terms of cost. Hence, carbon dioxide is preferable as the inactive substance. When the inactive substance is dry ice powder, sprayed coating 22, cutting edge 13, and atmosphere around cutting edge 13 are cooled appropriately. This case is particularly preferable because dimensional accuracy can be increased without increasing thermal shock to the cutting tool. It should be noted that as liquid inactive substances, there are liquefied carbonic acid gas and liquefied nitrogen; however, they have high coolability to promote damage of the cutting tool due to the thermal shock. Hence, such liquid inactive substances are not included in the inactive substance in the present embodiment.

As the value obtained by dividing the supplied amount of oil 3 to the recessed portion of sprayed coating 22 by the apparent weight of sprayed coating 22 becomes larger, the cooling effect by oil 3 becomes larger, with the result that the thermal shock to cutting tool 1 becomes stronger. Hence, in the method for manufacturing the member according to the embodiment, when the value obtained by dividing the supplied amount of oil 3 to the recessed portion of sprayed coating 22 by the apparent weight of sprayed coating 22 is more than or equal to 0.1 weight % and less than or equal to 2.7 weight %, the tool life of the cutting tool can be further improved.

(Cutting Test Result)

The following describes a cutting test performed to confirm the effect of the method for manufacturing the member according to the embodiment as well as a result of the cutting test.

Each of Table 1 and Table 2 shows details of cutting tools 1 and workpieces 2, which were used for the cutting test. As shown in Table 1 and Table 2, in each of sample 1 to sample 10-3, cutting edge 13 was formed at a sintered material in which the content of CBN was 90 volume %, the average crystal grain size of CBN was 2 μm, and a binder was a cobalt (Co) compound. In each of sample 11 and sample 12, cutting edge 13 was formed at a sintered material which had a surface provided with a TiAlN coating and in which the content of CBN was 60 volume %, the average crystal grain size of CBN was 3 μm, and a binder was titanium nitride (TiN).

In each of sample 13 and sample 14, cutting edge 13 was formed at a sintered material in which the content of CBN was 60 volume %, the average crystal grain size of CBN was 3 μm, and the binder was TiN. In a sample 15, cutting edge 13 was formed at a sintered material which had a surface provided with a TiCN coating and in which the content of CBN was 60 volume %, the average crystal grain size of CBN was 3 μm, and a binder was TiN. In a sample 16, cutting edge 13 was formed at a sintered material which had a surface provided with an AlCrN coating and in which the content of CBN was 60 volume %, the average crystal grain size of CBN was 3 μm, and a binder was TiN.

In each of sample 1 to sample 16, sprayed coating 22 was constituted of a carbon steel including 0.01 weight % of carbon. In each of sample 2, sample 9, sample 10-1, sample 12 and sample 14 to sample 16, sprayed coating 22 was immersed into oil 3. In this case, immersion time was 60 seconds. In sample 3, sample 6-1 to sample 6-4, sample 7-1 and sample 7-2, oil 3 was applied to the surface of sprayed coating 22. Oil 3 used for each of sample 2, sample 3, sample 6-1 to sample 6-4, sample 7-1 and sample 7-2, sample 9, sample 10-1, sample 12, and sample 14 to sample 16 was a rust preventive oil (provided by Yushiro Chemical Industry). The kinematic viscosity of the rust preventive oil at 40° C. was 5.0 mm²/s. It should be noted that in each of sample 2, sample 3, sample 6-1 to sample 6-4, sample 7-1 and sample 7-2, sample 9, sample 10-1, sample 12 and sample 14 to sample 16, oil 3 was supplied under the atmospheric pressure. In sample 8, sprayed coating 22 was immersed in a water-soluble coolant.

In each of sample 2, sample 3, sample 6-2 and sample 6-3, sample 7-1 and sample 7-2, sample 9, sample 10-1, sample 12 and sample 14 to sample 16, the supplied amount of oil 3 was within a range of more than or equal to 0.1 weight % and less than or equal to 2.7 weight % with respect to the apparent weight of sprayed coating 22. On the other hand, in sample 6-1, the supplied amount of oil 3 was more than 2.7 weight with respect to the apparent weight of sprayed coating 22, and in sample 6-4, the supplied amount of oil 3 was less than 0.1 weight % with respect to the apparent weight of sprayed coating 22. It should be noted that in each of sample 2, sample 3, sample 6-1 to sample 6-4, sample 7-1 and sample 7-2, sample 9, sample 10-1, sample 12 and sample 14 to sample 16, oil 3 was supplied under the atmospheric pressure.

water-soluble coolant. The water-soluble coolant used for each of sample 4 and sample 9 was obtained by diluting System Cut 96 (provided by Japan Fluid System) with 20 parts of water. In each of sample 5 and sample 10-1, the cutting was performed while supplying a very small amount of oil 3 in the form of mist to the vicinity of cutting edge 13. It should be noted that oil 3 used in each of sample 5 and sample 10-1 was LB-10 (provided by Fuji BC Engineering).

In the above-described cutting test, the cutting speed was 200 m/min, the feed rate was 0.1 mm/rev, and the amount of depth of cut was 0.1 mm. In the above-described cutting test, the tool life of each cutting tool 1 was evaluated in accor-

TABLE 1

| | Cutting Edge | | Workpiece | | Supplied Amount of Oil etc., with respect to Apparent Weight of Sprayed Coating |
|---|---|---|---|---|---|
| | Material | Coating | Sprayed Coating | Oil etc. | (Weight %) |
| Sample 1 | CBN Sintered Material | None | Fe—C0.01 | None | — |
| Sample 2 | CBN Volume Ratio: 90% | | | Rust Preventive Oil (Immersion) | 2.63 |
| Sample 3 | CBN Average Grain Size: 2 μm Binder Phase: Co Compound | | | Rust Preventive Oil (Application) | 1.87 |
| Sample 4 | | | | None | — |
| Sample 5 | | | | | — |
| Sample 6-1 | | | | Rust Preventive Oil (Application) | 3.12 |
| Sample 6-2 | | | | | 2.70 |
| Sample 6-3 | | | | | 0.10 |
| Sample 6-4 | | | | | 0.04 |
| Sample 7-1 | | | | Rust Preventive Oil (Application) | 2.31 |
| Sample 7-2 | | | | | 1.59 |
| Sample 8 | | | | Water-Soluble Coolant (Immersion) | 1.59 |
| Sample 9 | | | | Rust Preventive Oil (Immersion) | 2.28 |
| Sample 10-1 | | | | Rust Preventive Oil (Immersion) | 2.45 |
| Sample 10-2 | | | | None | — |
| Sample 10-3 | | | | | — |

TABLE 2

| | Cutting Edge | | Workpiece | | Supplied Amount of Oil etc., with respect to Apparent Weight of Sprayed Coating |
|---|---|---|---|---|---|
| | Material | Coating | Sprayed Coating | Oil etc. | (Weight %) |
| Sample 11 | CBN Sintered Material | TiAlN | Fe—C0.01 | None | — |
| Sample 12 | CBN Volume Ratio: 60% CBN Average Grain Size: 3 μm | | | Rust Preventive Oil (Immersion) | 2.20 |
| Sample 13 | Binder Phase: TiN | None | | None | — |
| Sample 14 | | | | Rust Preventive Oil (Immersion) | 2.29 |
| Sample 15 | | TiCN | | Rust Preventive Oil (Immersion) | 2.22 |
| Sample 16 | | AlCrN | | Rust Preventive Oil (Immersion) | 2.31 |

Table 3 shows details of cutting conditions in the above-described cutting test as well as a result of the above-described cutting test. As shown in Table 3, in each of sample 1 to sample 3, sample 6-1 to sample 6-4, sample 7-1 and sample 7-2, sample 8, sample 10-2 and sample 10-3, and sample 11 to sample 16, dry-cutting was performed. In each of sample 4 and sample 9, cutting was performed using a dance with a cutting distance until a chipping width measured from the flank face side became more than 100 μm.

As shown in Table 3, the tool life of sample 1 was 0.6 km. The tool life of sample 2 was 3.4 km. The tool life of sample 3 was 2.5 km. The tool life of sample 4 was 0.2 km. The tool life of sample 5 was 0.5 km. The tool life of sample 6-1 was 0.6 km. The tool life of sample 6-2 was 2.4 km. The tool life of sample 6-3 was 1.5 km. The tool life of sample 6-4 was 0.6 km. The tool life of sample 7-1 was 4.0 km. The tool life of sample 7-2 was 4.4 km.

The tool life of sample 8 was 0.4 km. The tool life of sample 9 was 0.3 km. The tool life of sample 10-1 was 0.5 km. The tool life of sample 10-2 was 0.5 km. The tool life of sample 10-3 was 0.5 km. The tool life of sample 11 was 0.2 km. The tool life of sample 12 was 1.5 km. The tool life of sample 13 was 0.2 km. The tool life of sample 14 was 1.2 km. The tool life of sample 15 was 1.3 km. The tool life of sample 16 was 1.4 km.

It should be noted that when the cutting test was performed in a manner similar to that for sample 7-1 while the gas introduced as the inactive substance was changed from $CO_2$ to each of Ar and $N_2$, it was confirmed that a result similar to that of sample 7-1 was exhibited in each of the cases where the gases of the inactive substances were used.

The embodiments disclosed herein are illustrative and non-restrictive in any respect. The scope of the present invention is defined by the terms of the claims, rather than

TABLE 3

|  | Coolant | Supply of Inactive Substance | Cutting Speed (m/min) | Feed Rate (mm/rev) | Amount of Depth of Cut (mm) | Tool Life (km) |
|---|---|---|---|---|---|---|
| Sample 1 | None | None | 200 | 0.1 | 0.1 | 0.6 |
| Sample 2 |  |  |  |  |  | 3.4 |
| Sample 3 |  |  |  |  |  | 2.5 |
| Sample 4 | Water-Soluble Coolant |  |  |  |  | 0.2 |
| Sample 5 | LB-10 (Very Small Amount; Mist) |  |  |  |  | 0.5 |
| Sample 6-1 | None |  |  |  |  | 0.6 |
| Sample 6-2 |  |  |  |  |  | 2.4 |
| Sample 6-3 |  |  |  |  |  | 1.5 |
| Sample 6-4 |  |  |  |  |  | 0.6 |
| Sample 7-1 |  | $CO_2$ Gas |  |  |  | 4.0 |
| Sample 7-2 |  | Dry Ice Powder |  |  |  | 4.4 |
| Sample 8 |  | None |  |  |  | 0.4 |
| Sample 9 | Water-Soluble Coolant |  |  |  |  | 0.3 |
| Sample 10-1 | LB-10 (Very Small Amount; Mist) |  |  |  |  | 0.5 |
| Sample 10-2 | None | $CO_2$ Gas |  |  |  | 0.5 |
| Sample 10-3 |  | Dry Ice Powder |  |  |  | 0.5 |
| Sample 11 |  |  |  |  |  | 0.2 |
| Sample 12 |  |  |  |  |  | 1.5 |
| Sample 13 |  |  |  |  |  | 0.2 |
| Sample 14 |  |  |  |  |  | 1.2 |
| Sample 15 |  |  |  |  |  | 1.3 |
| Sample 16 |  |  |  |  |  | 1.4 |

The tool lives of sample 2, sample 3, sample 6-1 to sample 6-4, and sample 8 were longer than the tool lives of sample 4, sample 5, sample 9, and sample 10-1. In view of this comparison, it was experimentally indicated that according to the method for manufacturing the member according to the embodiment, the tool life of cutting tool 1 is improved by performing the dry-cutting.

The tool lives of sample 2, sample 3, sample 6-2, sample 6-3, and sample 8 were longer than the tool life of sample 1. The tool life of sample 12 was longer than the tool life of sample 11. The tool life of sample 14 was longer than the tool life of sample 13. In view of these comparisons, it was experimentally indicated that according to the method for manufacturing the member according to the embodiment, the tool life of cutting tool 1 is improved by supplying the recessed portion of sprayed coating 22 with more than or equal to 0.1 weight % and less than or equal to 2.7 weight % of oil 3 with respect to the apparent weight of sprayed coating 22.

The tool life of sample 2 was longer than the tool life of sample 3. In view of this comparison, it was experimentally indicated that the tool life of cutting tool 1 is improved further by immersing sprayed coating 22 into oil 3. The tool lives of sample 7-1 and sample 7-2 were longer than the tool life of sample 2. In view of this comparison, it was experimentally indicated that the tool life is improved by cutting while supplying $CO_2$ to cutting edge 13. The tool life of sample 7-2 was longer than the tool life of sample 7-1. In view of this comparison, it was experimentally indicated that the tool life is improved further by cutting while supplying dry ice powder to cutting edge 13.

the embodiments described above, and is intended to include any modifications within the scope and meaning equivalent to the terms of the claims.

REFERENCE SIGNS LIST

1: cutting tool; 1a: substrate; 1b: cutting edge tip; 11: rake face; 12: flank face; 13: cutting edge; 13a: base; 13b: coating layer; 2: workpiece; 21: substrate; 21a: surface; 22: sprayed coating; 3: oil; S1: workpiece preparing step; S2: oil supplying step; S3: cutting step; V: void.

The invention claimed is:

1. A method for manufacturing a member having a substrate and a sprayed coating formed on a surface of the substrate, the method comprising:
   supplying an oil into a recessed portion of the sprayed coating, a kinematic viscosity of the oil at 40° C. being more than or equal to 3 mm$^2$/s and less than or equal to 43 mm$^2$/s; and
   dry-cutting, using a cutting tool, a surface of the sprayed coating with the recessed portion supplied with the oil, at least a portion of the cutting tool being constituted of a sintered material of cubic boron nitride,
   a cutting edge of the cutting tool being formed at the sintered material of cubic boron nitride,
   an amount of the oil retained in the recessed portion after the supplying of the oil being more than or equal to 0.1 weight % and less than or equal to 2.7 weight % with respect to an apparent weight of the sprayed coating.

2. The method for manufacturing the member according to claim 1, wherein the supplying of the oil is performed by applying the oil to the surface of the sprayed coating.

3. The method for manufacturing the member according to claim 1, wherein the supplying of the oil is performed by immersing the sprayed coating into the oil.

4. The method for manufacturing the member according to claim 1, wherein
   the cutting tool further includes a coating layer that coats the sintered material of cubic boron nitride, and
   the coating layer is constituted of a compound including at least one or more elements selected from a group consisting of titanium, aluminum, and chromium, and at least one or more elements selected from a group consisting of nitrogen, carbon, and oxygen.

5. The method for manufacturing the member according to claim 1, wherein in the dry-cutting using the cutting tool, the dry-cutting is performed while supplying an inactive substance to the cutting edge.

6. The method for manufacturing the member according to claim 5, wherein the inactive substance is a gas or solid of carbon dioxide.

7. The method for manufacturing the member according to claim 1,
   wherein the supplying of the oil is performed under an atmospheric pressure.

\* \* \* \* \*